UNITED STATES PATENT OFFICE.

JOHN H. DUGAN, OF CHICAGO, ILLINOIS.

COMPOSITION FOR PATCHING STONES.

1,065,926.   Specification of Letters Patent.   Patented July 1, 1913.

No Drawing.   Application filed August 26, 1911. Serial No. 646,219.

*To all whom it may concern:*

Be it known that I, JOHN H. DUGAN, a citizen of the United States, and a resident of the city of Chicago, county of Cook, and State of Illinois, have invented a new and useful Composition for Patching Stones, of which the following is a specification.

This invention relates to a composition adapted for use in patching or setting stone and in the process for making the composition.

The object of this invention is the production of a stone patching composition which will be adapted to be readily and easily applied and which when thoroughly dried and set will very closely resemble the stone to which it is applied so that the presence of a patch in the stone will not be apparent.

A further object is the provision of a process by which this composition may be easily and economically made.

Other objects will appear hereinafter.

In the process of making my composition I first employ limestone chips or dust, oölitic limestone being preferably used, placing the same in a kiln or furnace and burning or heating the same to redness for a period of about three hours or until the chips or pieces of stone crumble into a powder. In this burning or heating of the limestone the carbon dioxid is driven off, leaving lime. Oölitic limestone is a limestone found in certain quarries in the State of Indiana, and I have found it to be especially adapted for the purpose, and making a stronger and more durable product than other limestones, which I have tried. The lime or residue is then removed from the kiln or furnace and cooled. When cool the same is sifted to remove foreign matters or particles therefrom such as flint or shells. This being done the refined lime powder is thoroughly mingled with silica, and oxid of iron and magnesia which are all in powdered form. I have found that the addition of silica, oxid of iron and magnesia renders the product capable of adhering to stone with great tenacity and capable of withstanding wear and the action of the weather practically as well as the stone itself. The ingredients of the composition thus formed are combined preferably in the proportions stated, viz: lime 97.00, silica 1.25, oxid of iron .50, magnesia 1.25, water to form a plastic mass. The composition thus formed is ready for use in patching or setting stone.

The composition resulting from the above process is practically white or buff it being therefore adapted for use only in conjunction with or upon stone of a corresponding color. Where the composition is to be used upon or in conjunction with stones of other colors as for instance blue Indiana, red Portage sandstone or gray sandstone, suitable pigments will be added to the composition such as Japanese vermilion or blue to match the stone upon which it is desired to use the same composition.

The composition composed of the ingredients above named and combined as stated is adapted to adhere closely to the surface to which it is applied so as to practically become a part of the stone without fear of loosening or breaking off. The composition, after the addition of water as above mentioned is preferably applied with a trowel and after the same is dried and set it may be chiseled and smoothed in the same manner as the stone itself in order to conform with the surface or curvature of the latter.

The composition may be manufactured at a low cost and is of high efficiency in use.

I claim:

The herein described composition of matter comprising commercial quick lime consisting substantially of calcium oxid 97.26%, silica 1.69%, oxid of iron .49%, magnesia .37% and water .19%; additional silica; additional oxid of iron; additional magnesia and additional water to form a plastic mass of the whole, substantially as described.

In testimony whereof I have signed my name to this specification in the presence of two subscribing witnesses.

JOHN H. DUGAN.

Witnesses:
HELEN F. LILLIS,
JOSHUA R. H. POTTS.